3,598,818
METHOD FOR THE SEPARATION OF MELAMINE FROM A GASEOUS REACTION MIXTURE OF MELAMINE, AMMONIA AND CARBON DIOXIDE
Jacobus T. C. Krekels, Sittard, Netherlands, assignor to Stamicarbon N.V., Heerlen, Netherlands
Filed Nov. 17, 1969, Ser. No. 877,224
Claims priority, application Netherlands, Nov. 16, 1968, 6816385
Int. Cl. C07d 55/24
U.S. Cl. 260—249.7P
9 Claims

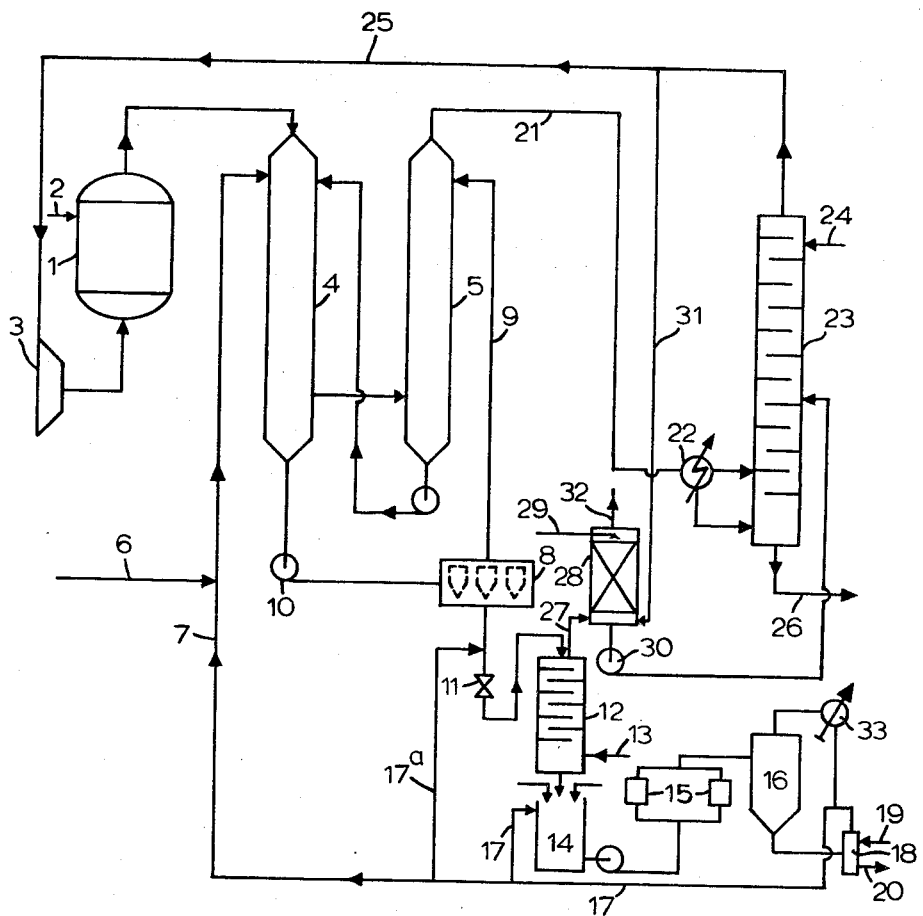

ABSTRACT OF THE DISCLOSURE

A process is disclosed for the separation and recovery of melamine from gaseous mixtures of melamine, ammonia and carbon dioxide obtained in the manufacture of melamine from urea and under superatmospheric pressure. The process involves feeding a dilute suspension of melamine crystals in a solution saturated with ammonium and carbon dioxide into at least one hydrocyclone and obtaining by separation therein (a) a concentrated aqueous melamine solution and (b) a dilute melamine solution; and recirculating this dilute melamine solution containing most of the ammonia and carbon dioxide components of the aforesaid gaseous mixture, to the initial cooling zone wherein melamine crystals are first obtained in the form of a suspension in an aqueous solution containing ammonia and carbon dioxide.

---

The present invention relates to the preparation of melamine from urea, and more particularly to the separation of melamine from the superatmospheric gaseous mixture of melamine, ammonia and carbon dioxide obtained in the conversion of urea to elamine.

It is already known that at atmospheric pressure, in the presence of ammonia and a suitable catalyst in gel form, for instance silica gel, and at a temperature between 250° C. and 400° C., urea can be converted to a gaseous mixture mainly consisting of melamine, ammonia and carbon dioxide.

To remove the melamine from said hot reaction mixture, the gaseous mixture is often cooled, in a cooling zone, by direct contact with a circulating aqueous solution containing ammonia and carbon dioxide, to form a thin suspension of approximately 5 percent by weight of solid melamine particles, with the sizes of said particles ranging usually between $20\mu$ and $150\mu$, whereupon the solid melamine particles are separated from the solution by centrifuging or filtration.

Working such a process under atmospheric pressure requires reaction and cooling zones of large volume. For this reason, it is economically attractive to carry out the conversion of urea to melamine under a superatmospheric pressure of e.g., 5 to 10 atmospheres. Even at such a still relatively low pressure, the reduction in reaction volume amply compensates for such cost-increasing factors as the larger wall thickness required for equipment when working under such elevated pressures.

If such a process is carried out under pressure, the hot gaseous reaction mixture may be cooled in such manner that the melamine vapor in the gas mixture desublimates, whereupon the solid melamine particles may be separated from the remaining gas mixture. However, if one should try to recover the melamine by direct cooling by means of a circulating aqueous solution containing $NH_3$ and $CO_2$ to form a melamine suspension in an aqueous solution of $NH_3$ and $CO_2$ under pressure, the separation between the solid melamine and the solution involves certain difficulties of a technical and economic nature.

For instance, if said pressurized suspension is allowed to expand to atmospheric pressure and the melamine is subsequently separated off by a known method, e.g., by centrifuging or filtration, one is faced with the disadvantage that owing to the expansion of the solution, which while under pressure is already saturated with $NH_3$ and $CO_2$, a large volume of dissolved ammonia and carbon dioxide is set free in the form of a gas mixture. Processing of such a gas mixture, for example into a form suitable for urea synthesis, or separating it into its ammonia and carbon dioxide components, involves extra costs, such that, while technically quite feasible, this method is economically unattractive.

If, on the other hand, one should try to avoid the expansion of the pressurized suspension of melamine in the $NH_3$- and $CO_2$-containing solution by centrifuging the suspension under pressure, then one is faced with the disadvantage that, until today, suitably operating continuous centrifuges have not been developed by which the very fine melamine crystals may be recovered (dimensions ranging between $20\mu$ and $150\mu$) and obtained in a state in which they are sufficiently free of mother liquor.

Moreover, if the mass of crystals thus separated out were then allowed to expand to atmospheric pressure, much $NH_3$ and $CO_2$ would be set free and lost or only difficultly recovered for re-use. Still further, if one should try to filter the mass under pressure, the amount of water required for the pressurized washing of the filter cake—consisting of very fine crystals—would be so large that only a difficultly processable dilute solution containing ammonia, carbon dioxide and melamine would be formed.

Consequently, this separation method cannot easily be realized for practical technical reasons.

The object of the present invention is to overcome the above-mentioned problems.

The present invention provides a technically and economically acceptable method for the separation of melamine crystals from a pressurized suspension of melamine in an aqueous solution, which solution contains melamine and is also saturated with ammonia and carbon dioxide, and which suspension has been obtained by conversion of urea into melamine, by direct cooling of the reaction gases consisting of melamine, ammonia and carbon dioxide with a continuously circulating solution containing ammonia and carbon dioxide.

According to the invention, the evolution of large quantities of gaseous ammonia and carbon dioxide during the separation of the melamine crystals from a pressurized thin suspension saturated with ammonia and carbon dioxide is prevented by first concentrating the thin suspension by means of one or more hydrocyclones to a concentration of 30 to 60 percent by weight of melamine crystals, while recirculating the practically melamine-free $NH_3$- and $CO_2$-saturated solution, whereupon the resulting concentrated suspension after expansion to atmospheric pressure, is fed to a stripping column in which, by applying heat, preferably by direct introduction of steam, the residual ammonia and carbon dioxide still present in the solution are virtually completely stripped off in an overhead stream. Next the melamine crystals are extracted by a known method, for example by centrifuging or filtration, from the suspension obtained as bottom product from the stripping column whereupon the mother liquor is recirculated through the process.

If the melamine obtained by this method does not meet desired purity requirements, it can be subjected to recrystallization processes, or like treatment steps.

In effect, the present invention provides an improvement for processes for the separation of melamine from a pressurized gaseous reaction mixture containing melamine, ammonia and carbon dioxide wherein such a gaseous mixture is directly cooled under pressure with an aqueous solution containing ammonia and carbon dioxide. The thus-formed "first" dilute suspension of melamine crystals is obtained in a solution saturated with ammonia and carbon dioxide. According to the improvement of this invention, this "first" dilute suspension is subjected to the centrifugation solution operating in at least one hydrocyclone, while still under pressure, to separate and form (a) a concentrated aqueous suspension containing 30–60% by weight of solid melamine as underflow from the hydrocyclones, and (b) a second dilute melamine suspension obtained as overflow from the hydrocyclones (e.g., of a solid melamine concentration up to about 1%, preferably no more than about 0.3%).

The second dilute suspension is then recirculated to the cooling operation mentioned above, whereas the concentrated melamine suspension is fed to a stripping column, operated at about atmospheric pressure, wherein most e.g., more than 75%, preferably at least about 95% of the ammonia and 85% of the carbon dioxide present in the solution component of said concentrated suspension are stripped off. From the stripping column, there is thus obtained, as the bottom product, an aqueous melamine suspension having at most about 0.2% of each ammonia and carbon dioxide. The melamine crystals are then obtained by separating the same from this bottom product suspension by means such as filtration or centrifugation.

According to one method of realization of the invention, said treatment steps can be incorporated into the process by first diluting the melamine suspension obtained as bottom product from the stripping column with such an amount of recirculating mother liquor that, if necessary with application of heat, the melamine crystals are dissolved, whereupon the solution thus obtained is filtered and—if required after addition of a decoloring agent, such as activated carbon, and after introduction of $CO_2$ to adjust the pH to the value required for clarification—subjected to a recrystallization process in a crystallizer.

One mode of practicing the invention is shown diagrammatically in the accompanying drawing.

In this scheme, molten urea is fed through line 2 and gaseous ammonia through line 25 and compressor 3 to a catalyst-filled reactor 1. The reaction gases containing melamine vapor are fed into a cooling system consisting of two series-connected columns 4 and 5. In the first column 4, the gases are brought into contact with water and/or recirculating mother liquid supplied in co-current flow through line 6 and/or line 7, respectively, and in column 5 the gases are brought into contact with the solution supplied in counter-current flow from the cyclone battery 8 through line 9.

The thin suspension of melamine crystals formed by cooling is fed by pump 10 to a battery of hydrocyclones 8, and the concentrated suspension leaving the cyclones at the bottom is expanded to atmospheric pressure in expansion valve 11 and fed to the stripping column 12. A dilute melamine suspension is obtained as overhead from the hydrocyclones 8 in an aqueous solution still saturated with ammonia and carbon dioxide, and recirculated through line 9 to column 5. The virtually melamine-free reaction gases leaving the top of column 5 through line 21 are fed to a separating column 23 via a condenser 22, where part of the water vapor condenses. By washing with liquid $NH_3$ supplied through the line 24, a separation takes place in column 23 such that gaseous $NH_3$ leaves the top of this column. This gaseous $NH_3$ is recirculated through line 25 to the melamine synthesis reactor, while an ammonium carbonate solution obtained as bottom product is carried away through line 26 to be further processed, for instance, by feeding the same to a urea synthesis plant.

The concentrated melamine suspension leaving the cyclone batter 8, which still contains some residual dissolved $NH_3$ and $CO_2$, is diluted with mother liquor supplied through line 17a (a melamine-saturated solution which contains but little $NH_3$ and $CO_2$), and is next then fed to the stripping column 12, where it is almost entirely freed of ammonia and carbon dioxide by means of low-pressure steam supplied through line 13; the gaseous mixture of $NH_3$, $CO_2$ and $H_2O$ leaving the top of the stripping column 12 through line 27 is first condensed to a solution in condenser 28, and then is delivered by pump 30 to column 23.

To the melamine-containing solution leaving the stripping column 12 as bottom product—which is further mixed with recirculating mother liquor—are added a decoloring agent and $CO_2$, in the clarification tank 14. The resulting melamine solution is filtered in alternately operating filters 15, the filtrate is subjected to a vacuum crystallization in the crystallizer system 16, whereupon the crystals thus formed are fed through line 20 to a drying system (not shown), after separation from the mother liquor in separator 18, and washing with washing water supplied through line 19.

The water vapor formed during the vacuum crystallization is sent through condenser 33 and added to the mother liquor discharged from separator 18. The mother liquor is recirculated through line 17 to be used as a solvent for melamine crystals to be recrystallized. A relatively small portion of this mother liquor is mixed with the concentrated melamine suspension either before or after the expansion. Another small portion may, if required, be fed to column 4 through line 7 as make-up coolant.

The invention will now be illustrated by the following example of a melamine production of approximately 400 kg./hr.

EXAMPLE

To the melamine synthesis reactor 1 operating at a pressure of 7 atmospheres absolute and a temperature of 400° C. are fed 1215 kg. of urea and 1740 kg. of gaseous $NH_3$ per hour. The reaction gases containing melamine vapor are fed to cooler 4, in which the pressure is also 7 atmospheres absolute and to which are further fed hourly quantities of 633 kg. of water and 636 kg. of recirculating mother liquor with a temperature of 120° C., in addition to the overflow from the cyclone battery, which recirculates through line 9 and column 5. The melamine suspension leaving column 4 has the following composition:

404 kg. of melamine crystals

As a solution:
    420 kg. of melamine
    806 kg. of $NH_3$
    197 kg. of $CO_2$
    5346 kg. of $H_2O$ This suspension is raised by pump 10 to a pressure of 9 atmospheres absolute to compensate the pressure drop across the cyclone battery and to prevent evolution of $NH_3$ and $CO_2$ gases owing to a pressure drop inside the cyclone cores.

The thick suspension flowing from the cyclone battery has the following composition:

381 kg. of melamine crystals

As a solution:
    24 kg. of melamine
    46 kg. of $NH_3$
    11 kg. of $CO_2$
    306 kg. of water This suspension is diluted with 1515 kg. of recirculating mother liquor expanded to atmospheric pressure, and the resulting melamine suspension is stripped in the stripping column 12 with 206 kg./hr. of low-pressure steam; after dilution with recirculating mother liquor, and after addition of a little Norit and a little $CO_2$ to bring the pH to a value of between 6 and 8, the suspension is filtered and fed to the crystallizer, where the melamine crystallizes out at a temperature of 70° C.

In this way, eventually 395 kg. of melamine crystals are obtained, containing 20 kg. of liquid, while 240 kg. of washing water are supplied through line 19 per hour.

The gas mixture leaving the stripping column 12, consisting of 119 kg. of water vapor, 45 kg. of ammonia and 12 kg. of carbon dioxide per hour, is absorbed in an absorption column 28, for which purpose 1538 kg./hr. of water is supplied through line 29; the solution thus formed is fed to column 23 by pump 30.

To the absorber 28 is also connected a blow-off line 31 for keeping the inert-gas content in the stream of ammonia circulating through the system at a constant level.

The ammonia (43 kg./hr.) carried along with the blown-off gases is absorbed in column 28, the non-absorbed inert gases leaving the system through line 32.

The pressure in the separating column 23 is 6 atmospheres absolute.

572 kg. of liquid ammonia per hour, containing 43 kg. of water, is supplied through line 24, while a diluted ammonium carbonate solution of the composition:

882 kg. of $NH_3$
456 kg. of $CO_2$
2652 kg. of $H_2O$ is discharged through line 26.

It will, of course, be appreciated that the scope and practice of this invention is not limited to the specific embodiment just described. Those skilled in the art, reading this specification, will understand that the invention may be performed by other embodiments, within the spirit and scope of the following claims.

What is claimed is:

1. In a process for the separation of melamine from a pressurized gaseous reaction mixture containing melamine, ammonia and carbon dioxide comprising directly cooling said gaseous mixture in a cooling zone under pressure with an aqueous solution containing ammonia and carbon dioxide, to form a first dilute suspension of melamine crystals in a solution saturated with ammonia and carbon dioxide, the improvements consisting essentially in treating said first dilute suspension, while still under pressure, to centrifugal forces in at least one hydrocyclone to form and separate (a) a concentrated aqueous suspension containing 30 percent to 60 percent by weight of solid melamine, and (b) a second more dilute melamine suspension; recirculating said second dilute suspension to the said cooling zone; feeding said concentrated suspension to a stripping column operated at about atmospheric pressure, whereby most of the ammonia and carbon dioxide still present in the solution component thereof are stripped off from said concentrated suspension and solution; and obtaining as the bottom product of said stripping column, an aqueous suspension substantially free of ammonia and carbon dioxide, and separating solid melamine from the liquid component of said bottom product suspension.

2. Process according to claim 1, wherein said gaseous reaction mixture is fed to said cooling zone under a pressure of 5 to 10 atmospheres absolute, and said first dilute melamine suspension leaving the cooling zone is subjected to said centrifugal forces under a pressure of approximately 2 atmospheres higher.

3. Process according to claim 1, wherein said second dilute melamine suspension has a solid melamine concentration of up to about 1% by weight.

4. Process according to claim 3, wherein said second dilute melamine suspension has a melamine concentration of up to about 0.3% by weight.

5. Process according to claim 1, wherein at least about 95% of the ammonia and 85% of the carbon dioxide present in the said concentrated melamine suspensions are stripped off therefrom.

6. Process according to claim 1 wherein said solid melamine from said bottom product suspension is separated by filtration.

7. Process according to claim 1 wherein said solid melamine from said bottom product suspension is separated by centrifugation.

8. Process according to claim 1, wherein said concentrated aqueous suspension of melamine is diluted prior to feeding the same to the said stripping operation.

9. Process according to claim 8, wherein the solid melamine is separated from said bottom product suspension by filtration, and wherein melamine crystals are formed by a crystallization process, said crystals are separated from the mother liquor, and the mother liquor is recirculated to said concentrated melamine suspension for dilution thereof with simultaneous dissolution of any melamine crystals therein.

References Cited

UNITED STATES PATENTS

| | | | |
|---|---|---|---|
| 2,696,299 | 12/1954 | Van Os | 209—172.5 |
| 2,700,468 | 1/1955 | Fontein | 209—211 |
| 3,290,308 | 12/1966 | Marten | 260—249.7 |
| 3,310,558 | 3/1967 | Oele et al. | 260—249.7 |

JOHN M. FORD, Primary Examiner